United States Patent [19]

Holmberg

[11] Patent Number: 4,851,812

[45] Date of Patent: Jul. 25, 1989

[54] PORTABLE DATA SYSTEM

[75] Inventor: Göran I. Holmberg, Boca Raton, Fla.

[73] Assignee: Basics Corporation, Boca Raton, Fla.

[21] Appl. No.: 203,852

[22] Filed: Jun. 7, 1988

[51] Int. Cl.$^4$ .............................................. B41J 11/56
[52] U.S. Cl. .................................. 340/407; 364/708;
                                                400/680; 400/682;
[58] Field of Search .................. 340/407, 700, 365 R;
                        364/708; 400/680, 681, 682, 683, 684, 685

[56] References Cited

U.S. PATENT DOCUMENTS 4,725,157  2/1988  Nakai et al. ..................... 400/683

FOREIGN PATENT DOCUMENTS 2739157  3/1979  United Kingdom .............. 364/708

Primary Examiner—Donnie L. Crosland
Attorney, Agent, or Firm—Sughrue, Mion, Zinn, Macpeak and Seas

[57] ABSTRACT

A portable data system includes a bottom plate 1 and a lid 4. The bottom plate carries a PC-computer 10 having a keyboard 11 and a pivotal presentation screen 12 which in its lowered position forms part of the upper surface of the computer. The system also includes a voltage source for powering the computer and the screen. A carrier plate 26 is intended to rest on the upper surface of the screen in the lowered position thereof. The carrier plate is attached to the bottom plate by means of two parallel-arm mechanisms 18–21 arranged on each side of the computer. These parallel-arm mechanisms enable the carrier plate together with the printer 27 carried thereby to be moved away from the computer and partially into the raised lid.

3 Claims, 2 Drawing Sheets

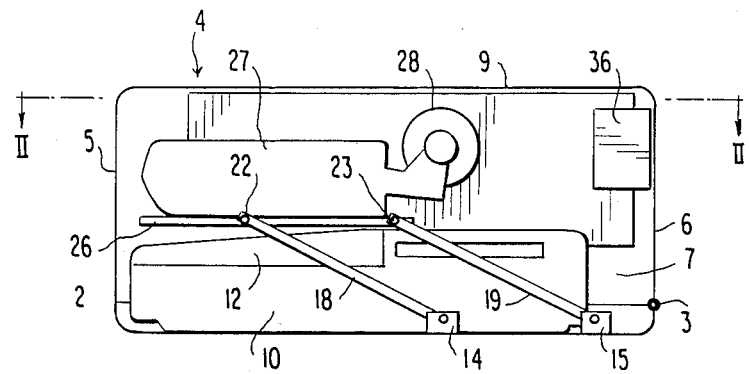
FIG. 1
FIG. 2
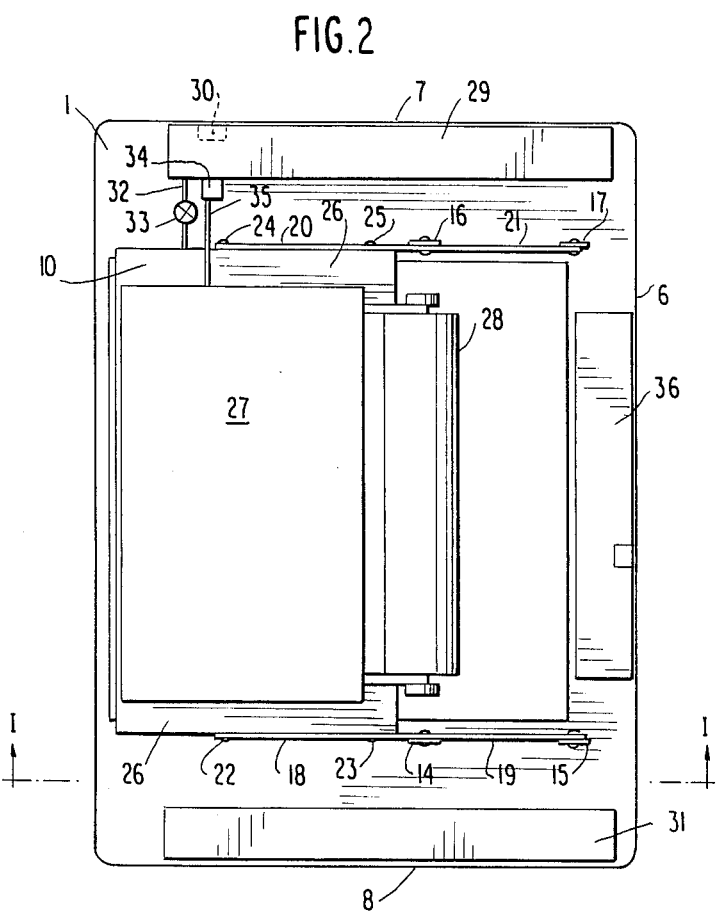

PORTABLE DATA SYSTEM

BACKGROUND OF THE INVENTION

The present invention relates to a portable data system comprising a rigid case which includes a lid and a bottom plate on which there is carried a PC-computer with keyboard and also a thin liquid-crystal presentation screen which can be raised and lowered in relation to the computer and which when in its lowered position forms substantially part of the upper surface of the computer, and further comprising a voltage source for powering the computer screen.

Such "brief-case size" computers have been found a useful instrument for use in aircraft, hotel rooms, etc., but have the serious drawback that the information or data inserted into the computer memory can only be made available on the presentation screen, even though there are many instances where it is important to record the data required on paper.

This problem has been solved hitherto, by using a separate printer for recording data on paper print-out sheets or webs. Such portable, or transportable, systems are awkward to use, however, since the printer is separate from the computer and needs to be connected to the computer with the aid of separate cables, and, furthermore, must be arranged in a separate protective case which is capable of withstanding knocks and bangs and other external influences. Thus when travelling by air for example, the user is required to transport, or carry, two separate units in addition to his/her normal baggage. Endeavors have been made to incorporate the printer in the computer case, with the printer mounted on the bottom part of the case, alongside the computer. As a result, the protective case has become too large and exceeds the permitted size of cabin luggage.

SUMMARY OF THE INVENTION

Consequently, the primary object of this invention is to provide a complete unit which includes a computer with presentation screen and printer, and also a voltage source for enabling the computer to be used on board an airplane or in other locations independently of external voltage sources, and which can be kept in a protective case whose external dimensions, e.g., lie within the permitted limits for aircraft cabin luggage.

BRIEF DESCRIPTION OF THE DRAWINGS

FIG. 1 is a side view of the invention portable data system taken on the line I—I in FIG. 2;

FIG. 2 is a sectional view taken on the line II—II in FIG. 1;

DETAILED DESCRIPTION OF THE PREFERRED EMBODIMENT

Figure 3:
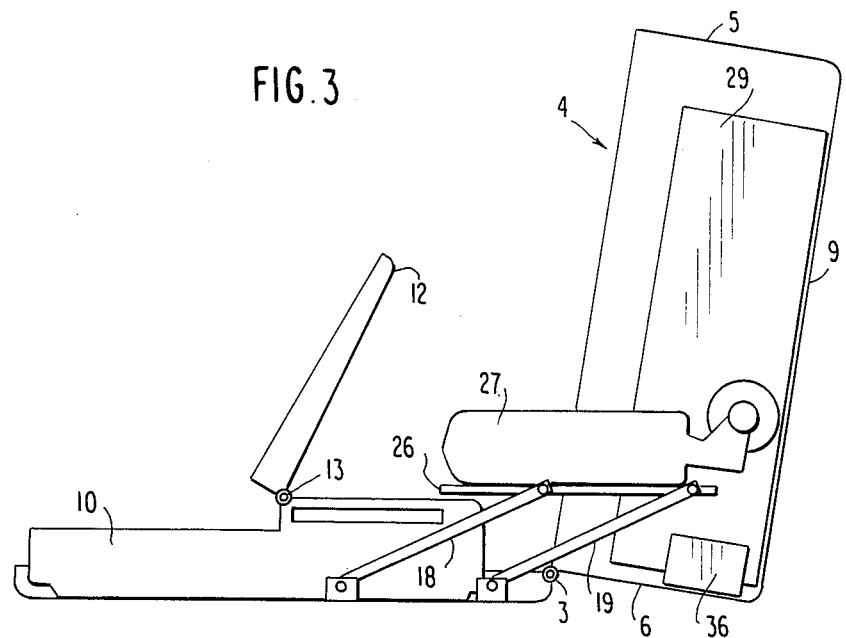
FIG. 3 is a sectional view taken on the line III—III in FIG. 4.
Figure 4:
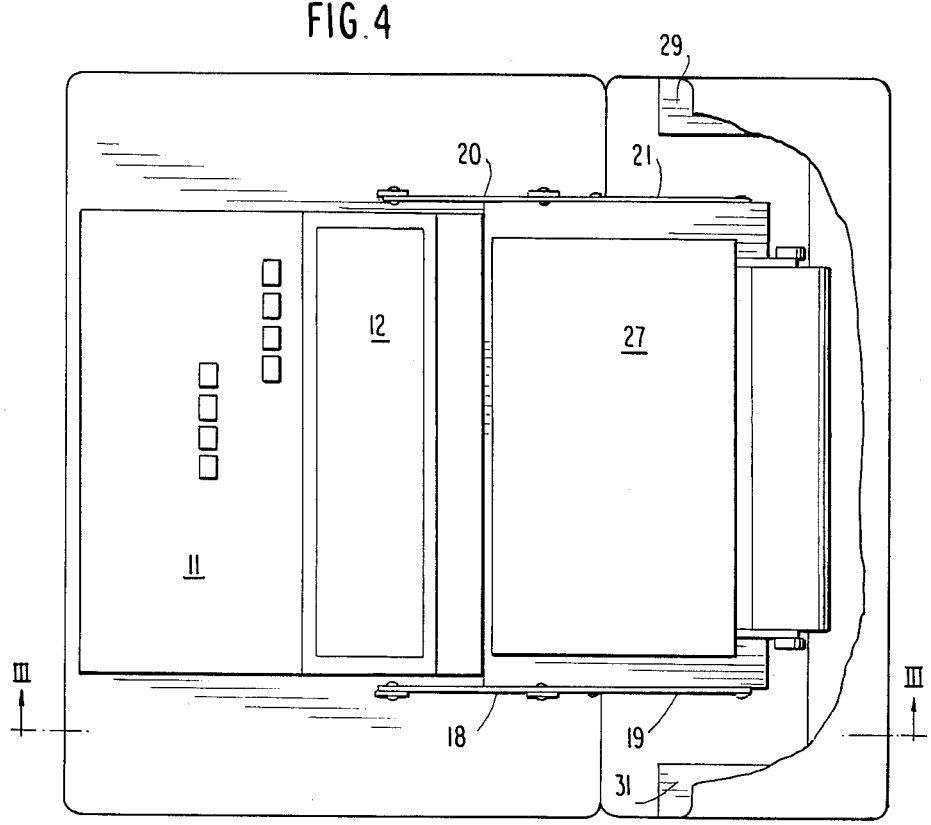
FIG. 4 illustrates the system in a working mode with part of the case lid cut-away for illustrative purposes.

FIGS. 1 and 2 illustrate the inventive system in its transporting mode. The system includes a case which comprises an elongate-rectangular bottom part 1 with a low circumferential lip 2, and a lid 4 which is hinged to the case by a hinge device 3. The lid 4 has a front wall 5, a rear wall 6, two side-walls 7 and 8 and a top wall or cover 9. The walls 5, 6, 7 and 8 are mutually of the same height and define a space which accommodates a PC-computer 10, which is attached to the planar bottom part 1 with means not shown. The computer 10 includes a keyboard 11 (FIG. 4) and a presentation screen 12, which can be lowered so as to cover the keyboard completely and which, when the computer is to be used, can be raised to the screen-viewing position illustrated in FIG. 3. The screen 12 is connected pivotally to the upper surface of the computer 10 by means of a hinge 13 (FIG. 3). Mounted on the bottom part 1 on both sides of the computer are respective journals 14, 15, 16 and 17, each of which has one end of a respective pivotal arm 18, 19, 20, 21 connected thereto. The other ends of respective arms are pivotally connected to pivot means or pivot pins 22, 23, 24 and 25. The pivot pins 22–25 are firmly attached to a planar carrier plate 26 and form a parallel mechanism. The plate 26, which has an elongated rectangular shape, lies substantially fully within the outer contours of the computer. FIG. 1 shows the rectangular carrier plate in a storage position, i.e. the position in which the computer system is carried, and more specifically in a position in which the plate 26 rests on the screen 12.

Securely attached to the carrier plate 26 is a printer 27, e.g. an ink printer, which is provided with a roller 28 for carrying a roll of printing paper on which data or information, or calculations carried out by the computer, is recorded when the computer 10 is used. Firmly mounted on the side wall 7 of the illustrated embodiment is a battery 29 which can be charged via a charging contact 30 illustrated schematically in FIG. 2. The system can be charged, e.g., from a car battery or from the mains supply via a conventional adapter.

The battery 29 of the illustrated embodiment is assumed to have a voltage of 12 Volts and is intended to power all of the voltage requiring units 10, 12, 27. A second, corresponding battery 31 is firmly mounted on the opposite side wall 8 of the lid 4, and can also be charged via the contact 30. Voltage is supplied to the various voltage—requiring units 10, 12, 27 over electrical cables, for instance the cable 32 indicated in FIG. 2, for supplying voltage from the battery 29 and the battery 31 connected, for example, in parallel with the battery 29. The cable 32 incorporates a switch 33 by means of which voltage can be applied to all units 10, 12, 27, or solely to the units 10 and 12. When wishing to activate the printer 27 separately, a separate cable is provided for the printer and a separate switch for supplying the voltage thereto, via a cable not shown. The printer 27 may, in some cases, be of the kind which requires a voltage which is higher or lower than the voltage required by the computer, in which case voltage is supplied to the printer via a static converter 34 and a cable 35. As illustrated in FIG. 2, a charging unit 36 is firmly mounted on the rear side wall of the lid 4, this charging unit replacing the aforesaid adapter when the batteries are charged directly from the mains supply. The charging unit is connected to the batteries by cables (not shown) and may include and replace the aforesaid converter 34.

As will be seen from FIG. 3, when the computer system is to be used, the lid 4 is lifted. With the lid raised to its FIG. 3 position, the printer 27 can be displaced arcuately through the facility of the aforedescribed parallel-arm mechanism 18, 19, 20, 21, so as to be located partially within the lid confines and exposing the presentation screen 12, which is lifted to the working position illustrated in FIG. 3, thereby also exposing the keyboard 11. Subsequent to supplying voltage to the computer 10 and the screen 12, and optionally also to the printer 27, the system can be used in the manner desired.

It will be evident from the aforegoing that the provision of the printer 27 results in the configuration of a complete, portable data system, and that the dimensions of the protective case can be kept within given dimensions for, inter alia, aircraft cabin baggage, while at the same time obviating the need for loose connecting cables.

I claim:

1. A portable data system including a rigid case having a lid (4) and a bottom plate (1) which carries a PC-computer (10) having a keyboard (11) and a thin liquid-crystal presentation screen (12) which can be raised and lowered relative to the computer and which in a lowered position forms essentially part of the upper surface of the computer, and a voltage source (29, 31) for powering the computer and the presentation screen, the system further comprising a carrier plate (26) which is intended to rest on the upper surface of the screen when the screen occupies its lowered position, and which carrier plate is movable upwards and away from the keyboard and the screen to a working position through the agency of two parallel-arm mechanisms (18–21) located on each side of the computer and on the bottom plate, and an ink printer (27) which is powered by said voltage source firmly mounted on the carrier plate, said printer projecting partially into the lid in a raised position thereof.

2. A system according to claim 1, wherein said voltage source comprises two rechargeable batteries mounted in the lid of the case and which form therebetween a space which freely accommodates the computer, the screen and the printer when the lid is lowered towards the bottom plate.

3. A system according to claim 2, further comprising a static converter (34) arranged in the case for supplying an operating voltage to the printer which is different from the operating voltage of the computer.

* * * * *